April 25, 1933. W. OWEN 1,905,743
APPARATUS FOR MAKING PLATE GLASS
Filed July 25, 1929 5 Sheets-Sheet 1

INVENTOR
Wm Owen
By James C Bradley
Atty

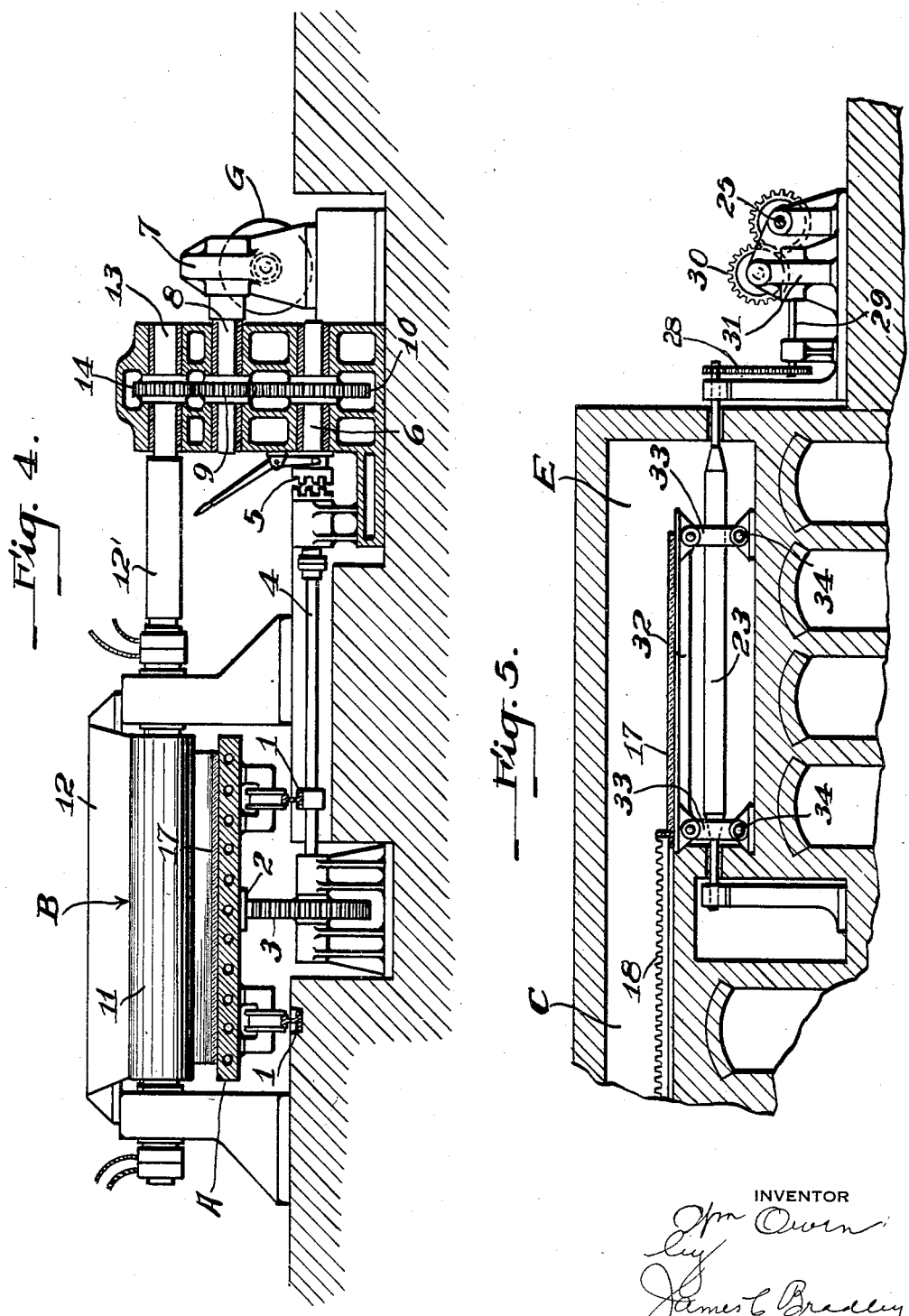

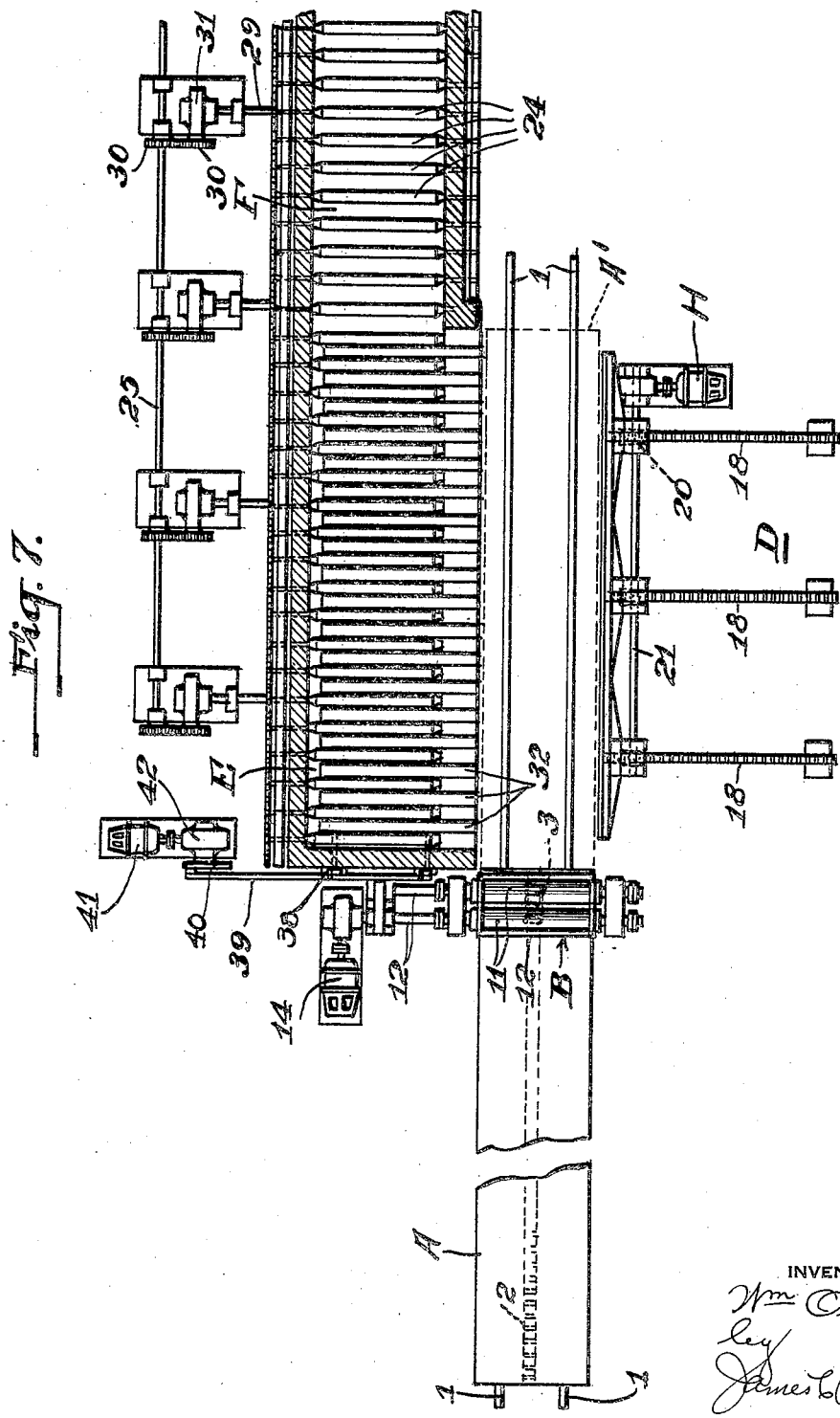

Patented Apr. 25, 1933

1,905,743

UNITED STATES PATENT OFFICE

WILLIAM OWEN, OF PITTSBURGH, PENNSYLVANIA, ASSIGNOR TO PITTSBURGH PLATE GLASS COMPANY, A CORPORATION OF PENNSYLVANIA

APPARATUS FOR MAKING PLATE GLASS

Application filed July 25, 1929. Serial No. 380,910.

Figure 1:
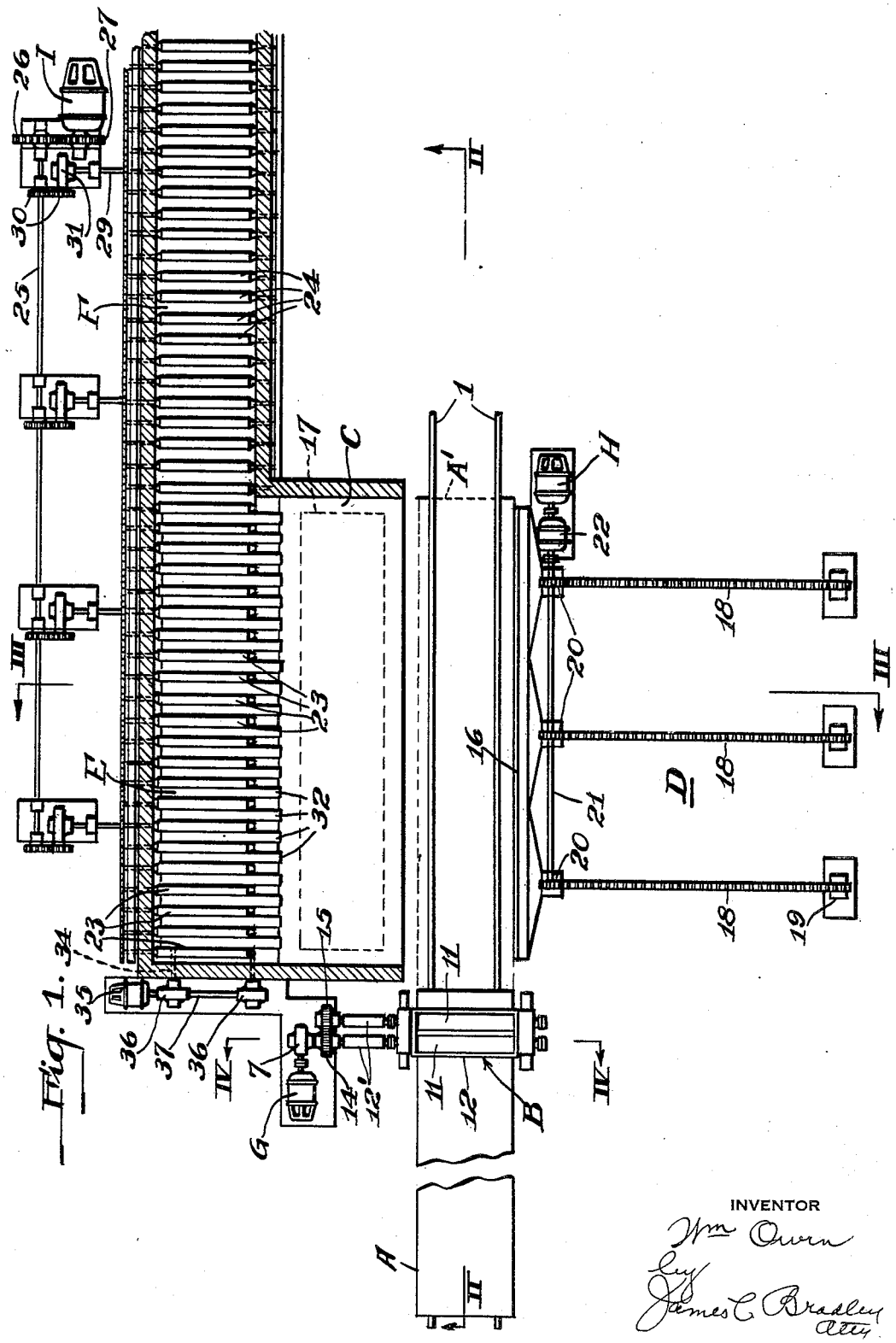
Figure 2:
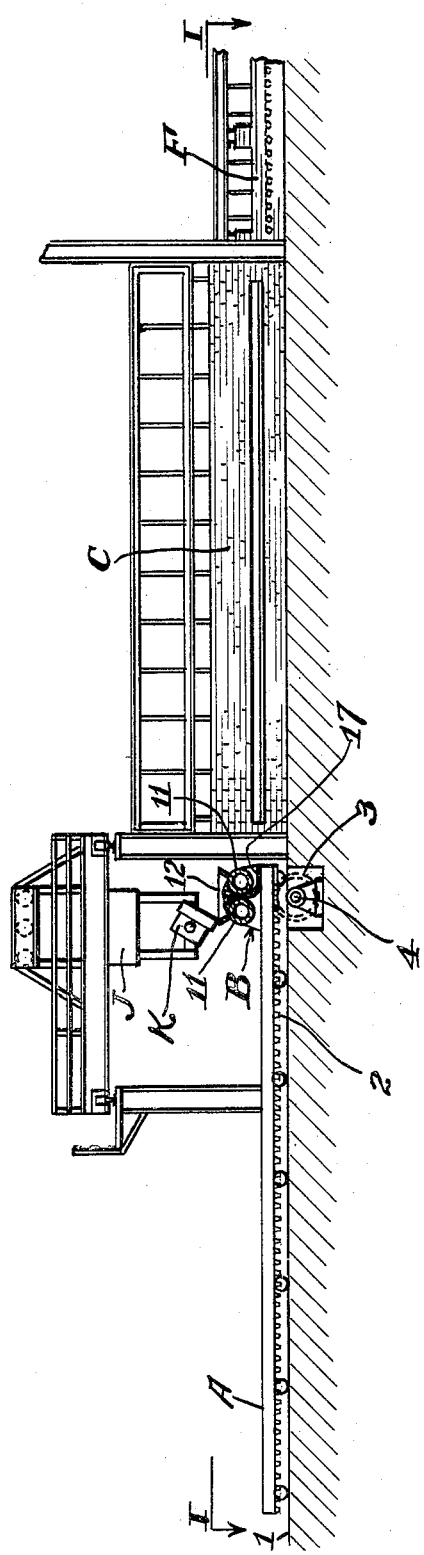
Figure 3:
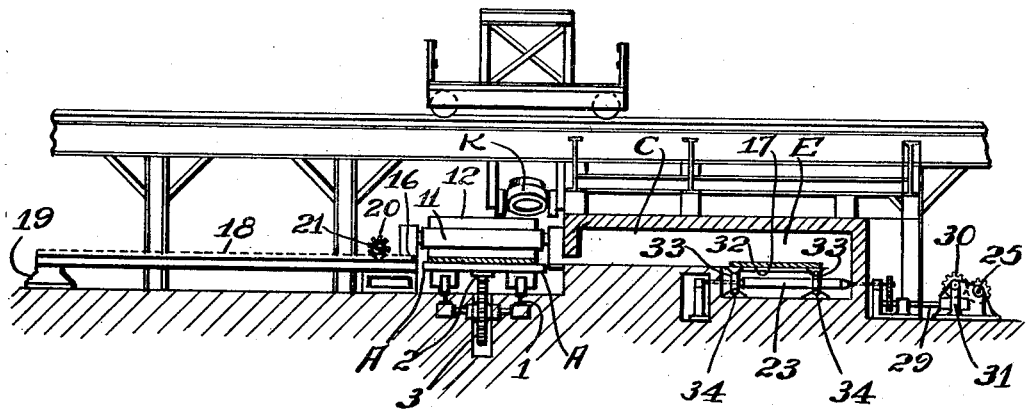
Figure 6:
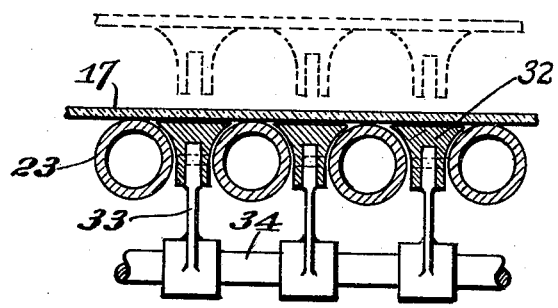

The invention relates to apparatus for making plate glass by an intermittent rolling or casting operation. It has for its object the provision of improved means for transferring the sheet formed from the receiving table into a roller leer, in which latter the sheet is flattened and annealed. One of the important features of construction consists in the receiving leer section, which is in alinement with a main roller leer section. This receiving section comprises a set of bars interspersed with a set of rollers driven at the same speed as the rollers in the main leer section. Either the rollers or the bars (preferably the bars) in the receiving leer section are mounted for vertical movement, so that after the seat is stowed on the bars, it may be transferred to the rollers which carry it along into the main leer section. The sheet is rolled or cast onto a movable table which is brought alongside the receiving leer section to permit the stowing of the sheet laterally into the leer section. The receiving end of the leer is run at a relatively high temperature so as to soften the sheet so as to permit its flattening as it progresses over the rollers into the stretches of the leer which are of progressively lower and lower temperatures. Certain embodiments of the invention are illustrated in the accompanying drawings, wherein:

Figure 1 is a section through the apparatus on the line I—I of Fig. 2. Fig. 2 is a section on the line II—II of Fig. 1. Fig. 3 is a section on the line III—III of Fig. 1. Fig. 4 is a section on the line IV—IV of Fig. 1. Fig. 5 is a partial section on an enlarged scale, also taken on the line III—III of Fig. 1. Fig. 6 is an enlarged detail section through a portion of the leer receiving section. And Fig. 7 is a view similar to that of Fig. 1 through a modification.

Referring to the drawings, A is a receiving table mounted for movement beneath the rolling apparatus B to the dotted line position A′; C is an oven into which the sheet is transferred after the table is moved to its forward position A′; D is stowing apparatus for moving the sheet from the table into the oven C and later moving it into the receiving section of the leer; E is the receiving section of the leer into which the sheet is transferred from the oven C; F is the main leer section; G is an electric motor which operates the rolls of the rolling apparatus B and also moves the table A back and forth; H is an electric motor for operating the stowing device D; I is an electric motor for operating the rollers of the leer sections E and F; and J (Fig. 2) is a crane by means of which the pot K of molten glass is brought to casting position over the rolling apparatus B, as indicated in Fig. 2.

In operation, a pot of glass is brought to position over the rolling apparatus, as indicated in Fig. 2, and poured between the two forming rolls, at which time the table A is moved to the right from the full line position of Fig. 2 to the dotted line position A′ of Fig. 1, thus bringing the sheet of glass carried by the table alongside the oven C. The sheet is shoved from the table through a slot in the side of the oven where it is allowed to remain until it cools and stiffens. It is next moved by the stowing device from the oven into the receiving section E of the leer which contains a set of bars interspersed with a set of rollers, the latter being driven by the same means which drive the rolls in the main section F of the leer. The sheet is received by the set of bars which lie at a level above that of the tops of the rolls. The sheet rests momentarily only upon the bars which are then lowered, depositing the sheet upon the rotating rollers which carry it forward into the main leer section, thus completing the cycle.

The table A which receives the glass sheet from the casting apparatus preferably has a cast iron bed suitably cooled, and is mounted on the track 1. The table has on its lower side a rack 2 engaged by a gear 3 mounted on the shaft 4. The shaft 4 is connected by means of a clutch 5 (Fig. 4) with an aligned shaft 6 driven from the motor G through the intermediary of worm reduction gearing in the casing 7, the shaft 8 driven from the worm reduction gearing, the pinion 9 and the gear 10.

The rolling apparatus B comprises a pair of water cooled rolls 11 and a hopper 12 for confining the body of glass poured from the pot K. The glass sheet is delivered from the rolls onto the surface of the table A, as indicated in Fig. 2. The rolls are driven by means of a pair of tumbler shafts 12', 12', one of which is connected at its end to a shaft 13 (Fig. 4), which shaft is driven from the pinion 9 by means of the gear 14 which is keyed to the shaft 13. The gear 14 drives the pinion gear 15 mounted on another shaft in parallel with the shaft 13 and connected to the other tumbler shaft 12'.

The stowing device D comprises a head 16 for engaging the side edge of the sheet 17 and three bars 18, 18, 18 guided in the stands 19, 19, etc. These bars are provided with racks upon their upper faces engaged by pinions 20, 20, 20 mounted on the shaft 21, the shaft 21 being driven from the motor H through suitable reduction gearing in the casing 22. The rolls 23 in the leer receiving section E and the rolls 24 in the main leer section F are all driven from the line shaft 25 extending the length of the leer. This line shaft is driven from the motor I through the gears 26, 27. The leer rolls are divided into sets, each set being driven by a sprocket chain 28 passing around sprockets on the ends of the rolls, and these chains are driven from the cross shafts 29, 29, etc. provided with sprockets engaging the chains. The cross shafts are in turn driven from the shaft 25 by gearing, including the gears 30, and worm gearing in the casing 31, this chain drive for the roller means being well known in the art and requiring no more specific description.

Interspersed with the rollers 23 of the leer receiving section are the drop bars 32, 32, etc., such bars being vertically movable and being adapted to receive the sheet 17 when it is moved from the oven into the leer receiving section E. The tops of these bars, therefore, lie when in receiving position at the level of the floor of the oven and above the tops of the rollers 23. After the sheet has been received upon these bars they are lowered to the position indicated in full lines in Fig. 6, at which time their upper edges lie below the tops of the rolls 23, thus transferring the sheet from the bars to the rolls which then carry the sheet forward into the main section F of the leer. Fig. 6 also shows the drop bars in dotted lines in their raised positions, at which time their upper faces are at the level of the surface of the oven. In order to provide for the raising and lowering of the bars, each bar is mounted upon a pair of links 33, 33, and these links are carried upon shafts 34, 34 extending longitudinally of the leer section. When these shafts are rotated in a clockwise direction (Fig. 5), the links are swung to the right, thus lowering them and the drop bars carried thereby to the full line position of Fig. 6, the bars and links being shown in their upper positions in Fig. 5. A separate motor 35 is provided for rotating the shafts 34, 34 and thus raising and lowering the bars. Each of the shafts is provided at its end with a worm wheel engaged by a worm in the casings 36, 36 and these worms are driven from the drive shaft 37 of the motor (Fig. 1). In this manner the drop bars may be moved up and down from the motor to transfer the sheet from the bars to the rollers 23, as required by the operation of the apparatus.

Fig. 7 illustrates a modification which differs primarily from the construction of Figs. 1 to 6 in that the oven C is eliminated and the glass is stowed directly from the receiving table A' to the receiving end E of the leer by means of the stowing device D. The means for rolling out the sheet, for stowing it from the table and for operating the rolls in both leer sections are the same as heretofore described in connection with Figs. 1 to 6 and, therefore, require no further explanation, similar reference numerals having been applied throughout. The means for raising and lowering the drop bars 32 is also the same as in the first form of construction except as to the mechanism for rotating the shafts 34. In this construction of Fig. 7, the shafts are provided at their ends with crank discs 38 and such crank discs are connected to the rod 39 which has its other end connected to a crank 40, such crank being driven from the motor 41 through the intermediary of suitable reduction gearing in the casing 42.

What I claim is:

1. Apparatus for making sheet glass comprising a receiving leer section provided with a set of rollers whose members are interspersed with the members of a set of bars, one of which sets is mounted for vertical movement so that in one position the tops of the rollers lie above the upper faces of the bars and in another position the tops of the rollers lie below the upper faces of the bars, a main roller leer section in alignment with said receiving section, means for driving the rollers of the two leer sections at the same speed, means for rolling out a sheet of glass and depositing it alongside said receiving leer section, means for stowing the sheet laterally upon said set of bars, and means for moving one of said sets vertically to transfer the sheet to the set of rollers so that the sheet is forwarded into said main leer section.

2. Apparatus for making sheet glass comprising a receiving leer section provided with a set of rollers whose members are interspersed with the members of a set of bars, one of which sets is mounted for vertical movement so that in one position the tops of the rollers lie above the upper faces of the bars and in another position the tops of the rollers lie below the upper faces of the bars, means for raising and lowering the movable set, a main roller leer section in alignment with said receiving section, means for driving the rollers of the two sections at the same rate of speed, a flat receiving surface alongside said receiving leer section at the level of said bars, means for rolling out a sheet and depositing it upon said receiving surface, and means for shoving the sheet laterally from said surface onto the set of bars in the receiving leer section.

3. Apparatus for making sheet glass, comprising a receiving leer section provided with rollers interspersed with lifting bars mounted for vertical movement so that in one position their upper faces lie above the rollers and in another position such faces lie below the tops of the rollers, a main roller leer section in alignment with said receiving section, means for driving the rollers of both sections at the same peripheral speed, means for rolling out a sheet of glass and depositing it alongside said receiving leer section, means for stowing the sheet laterally upon said bars with such bars in their raised positions, and means for lowering the bars to transfer the sheet to said rollers.

4. Apparatus for making sheet glass, comprising a receiving leer section provided with rollers interspersed with lifting bars mounted for vertical movement so that in one position their upper faces lie above the rollers and in another position such faces lie below the tops of the rollers, means for raising and lowering said bars, a main roller leer section in alignment with said receiving section, means for driving the rollers of said sections at the same peripheral speed, a flat receiving surface alongside said receiving leer section at the level of said bars when they are in raised position, means for rolling out a sheet and depositing it upon said receiving surface, and means for shoving the sheet laterally from said surface into said receiving leer section onto said bars.

5. Apparatus for making sheet glass, comprising a receiving leer section provided with rollers interspersed with lifting bars mounted for vertical movement so that in one position their upper faces lie above the rollers and in another position such faces lie below the tops of the rollers, means for raising and lowering said bars, a main roller leer section in alignment with said receiving section, means for driving the rollers of said sections at the same peripheral speed, an oven alongside said receiving leer section having its bottom at the level of said bars when they are in raised position, a sheet receiving table along one side of the oven with its surface at the level of said floor, means for forming a glass sheet and depositing it on the table, and stowing means movable laterally across the table and oven for moving the sheet from the table onto the floor of the oven and for moving it from the floor of the oven onto said bars in the receiving leer section.

In testimony whereof, I have hereunto subscribed my name this 19th day of July, 1929.

WILLIAM OWEN.